DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 23, 1971

892 O.G. 1211

T892,010
MODACRYLIC FIBERS OF REDUCED FLAMMABILITY

Thomas H. Larins, Jr., 300 Stuffle St., Kingsport, Tenn. 37660

Filed Dec. 11, 1970, Ser. No. 97,354
Int. Cl. C08f *15/22*
U.S. Cl. 260—897 C
No Drawing. 7 Pages Specification

A modacrylic textile fiber reduced flammability comprising (A) Fiber forming polymeric material comprised of a copolymer of (1) acrylonitrile and
(2) vinyl chloride or vinylidene chloride (B) Uniformly dispersed throughout the fiber, based on the weight of the fiber, from about 1 to about 15 weight percent of a metal compound such as antimony oxide, tin oxide, bismuth oxide, arsenic oxide, molybdenum oxide, vanadium oxide, platinum oxide, aluminum oxide, boron oxide, phosphorus oxide, and mixtures thereof.

The fiber forming polymeric material (A) may contain an additional, dissimilar polymer component. Tin oxides such as SnO and $SnO_2$ are especially useful in this invention. Other metal compounds such as esters can be used. Stannous acetate is particularly useful in this invention. Also disclosed is a process for producing the above fiber wherein the fiber is spun from a spinning dope solution of a modacrylic fiber and a metal compound which is uniformly dispersed throughout the spinning dope solution.